(12) United States Patent
Kim et al.

(10) Patent No.: US 6,772,428 B2
(45) Date of Patent: Aug. 3, 2004

(54) OPTICAL WRITING AND READING APPARATUS

(75) Inventors: Young-Taek Kim, Yongin-si (KR); Bong-Girl Min, Suwon-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 214 days.

(21) Appl. No.: 10/139,372

(22) Filed: May 7, 2002

(65) Prior Publication Data

US 2003/0169673 A1 Sep. 11, 2003

(30) Foreign Application Priority Data

Mar. 5, 2002 (KR) .......................................... 2002-11652

(51) Int. Cl.[7] ............................................... G11B 23/00
(52) U.S. Cl. ..................................... 720/697; 720/700
(58) Field of Search ............................... 369/77.1, 263, 369/264, 270

(56) References Cited

U.S. PATENT DOCUMENTS

| | | | | |
|---|---|---|---|---|
| 5,825,746 A | * | 10/1998 | Lee | 369/270 |
| 5,903,540 A | * | 5/1999 | Ro et al. | 369/263 |
| 6,014,362 A | * | 1/2000 | Park | 369/258 |
| 6,160,780 A | * | 12/2000 | Furukawa et al. | 369/75.2 |
| 6,667,945 B2 | * | 12/2003 | Omori | 369/263 |
| 2003/0185141 A1 | * | 10/2003 | Kurosaka et al. | 369/269 |

FOREIGN PATENT DOCUMENTS

JP             01279459 A    * 11/1989    .......... G11B/19/20

* cited by examiner

Primary Examiner—David Ometz
Assistant Examiner—Mark Blouin
(74) Attorney, Agent, or Firm—Morgan, Lewis & Bockius LLP

(57) ABSTRACT

An optical writing and reading apparatus is disclosed. The apparatus has a deck base having an opening at its center, on which an optical pickup including an object-glass is mounted to be moved along both sides of the opening, and which is formed adjacent to the opening with a center hole elongated in a direction perpendicular to a moving direction of the optical pickup, and is formed around the center hole with a plurality of fastening holes into which screws are screwed, and a spindle motor having a turntable at its shaft and having an integral bracket at its bottom surface, the bracket being formed at its center with a center reference hole and formed around the center reference hole with assembling holes elongated in a direction perpendicular to a moving direction of the optical pickup, the assembling holes being arranged at positions corresponding to the fastening holes of the deck base. It is possible to easily adjust an optical pickup in a direction perpendicular to a moving path of the optical pickup and thus overcome phase differences between a turntable and an object-glass occurring during assembly. Optical writing and reading performances and reliability of products are improved.

13 Claims, 5 Drawing Sheets

OPTICAL WRITING AND READING APPARATUS

BACKGROUND OF THE INVENTION

1. Field of the Invention

The present invention relates to an optical writing and reading apparatus, and more particularly to an optical writing and reading apparatus which is adapted to enable a position of a spindle motor in a tangential direction to be easily controlled in a case of assembly of the spindle motor, thereby facilitating adjustment of phase differences of an optical disk.

2. Description of the Prior Art

In general, an optical writing and reading apparatus used to write data on a disk and/or read data from a disk by using an optical system.

In such an optical writing and reading apparatus, an optical disk is seated on a turntable by a disk loading device, and is rotated at a certain rotational speed by a spindle motor. During rotation of a disk, the optical pickup irradiates laser beams on the disk to write data on the disk or read data from the disk while radially moving on the disk by a driving motor and gears.

FIG. 1 shows a conventional deck base assembly of an optical writing and reading apparatus. As shown in the drawing, a deck base 1 is formed with an opening 1a at its center, and is provided at its side with a spindle motor 2, which is mounted thereon via a bracket 4. A turntable 3, on which an optical disk "D" is seated, is rotatably coupled to a shaft of the spindle motor 2 and supported thereby.

A primary shaft 6 and a secondary shaft 6' are extended parallel to and along both sides of the opening 1a, and the opposite ends of the primary and secondary shafts 6 and 6' are supported on the deck base 1 by support members 7 which are fixed to the deck base 1 to be adjusted in tilt.

An optical pickup including an object-glass 5a is mounted on the primary and secondary shafts 6 and 6', and moved along the primary and secondary shafts 6 and 6' by the transmission gears 8.

FIG. 2 shows a spindle motor mounted on a deck base. As shown in the drawing, the spindle motor 2 is integrally provided at its bottom with a bracket 4 fixed thereto, and the bracket 4 is joined to an upper surface of a deck base 1 by screws "B", thereby fixing the spindle motor 2 to the deck base 1.

More specifically, the deck base 1 is formed with a central hole 1b over which the spindle motor 2 is placed, and is formed around the central hole with fastening holes 1c through which the screws "B" are screwed. The bracket 4 is formed with a center reference hole 4a at a position corresponding to the central hole 1b, and is formed around the reference hole 4a with assembly holes 4b corresponding to the fastening holes 1c and with specific spacing.

However, such a conventional optical writing and reading apparatus has disadvantages in that the center of an object-glass does not coincide with the center of a turntable but deviates from the center of the turntable because of deformation of components or manufacturing tolerance, thereby deteriorating optical performance.

That is, when a spindle motor 2 is coupled to a deck base 1 or an optical pickup 5 is mounted on primary and secondary shafts 6 and 6', and when tilt of a deck base 1 is adjusted using a separate tilt adjusting device, the center of an object-glass 5a does not coincide with the center of a turntable 3 but deviates from the center of the turntable 3 because of deformation of components or manufacturing tolerance, thereby causing operational errors and thus deteriorating reliability of products.

SUMMARY OF THE INVENTION

Accordingly, the present invention has been made keeping in mind the above problems occurring in the prior art, and an object of the present invention is to provide an optical writing and reading apparatus which is capable of adjusting a fixing position of a turntable so as to overcome phase differences between an object-glass and the turntable, which may occur during assembly.

In order to accomplish the above object, the present invention provides an optical writing and reading apparatus comprising: a deck base having an opening at its center, on which an optical pickup including an object-glass is mounted to be moved along both sides of the opening, and which is formed adjacent to the opening with a center hole elongated in a direction perpendicular to a moving direction of the optical pickup, and is formed around the center hole with a plurality of fastening holes into which screws are screwed; and a spindle motor having a turntable at its shaft and having an integral bracket at its bottom surface, the bracket being formed at its center with a center reference hole and formed around the center reference hole with assembling holes elongated in a direction perpendicular to a moving direction of the optical pickup, the assembling holes being arranged at positions corresponding to the fastening holes of the deck base.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
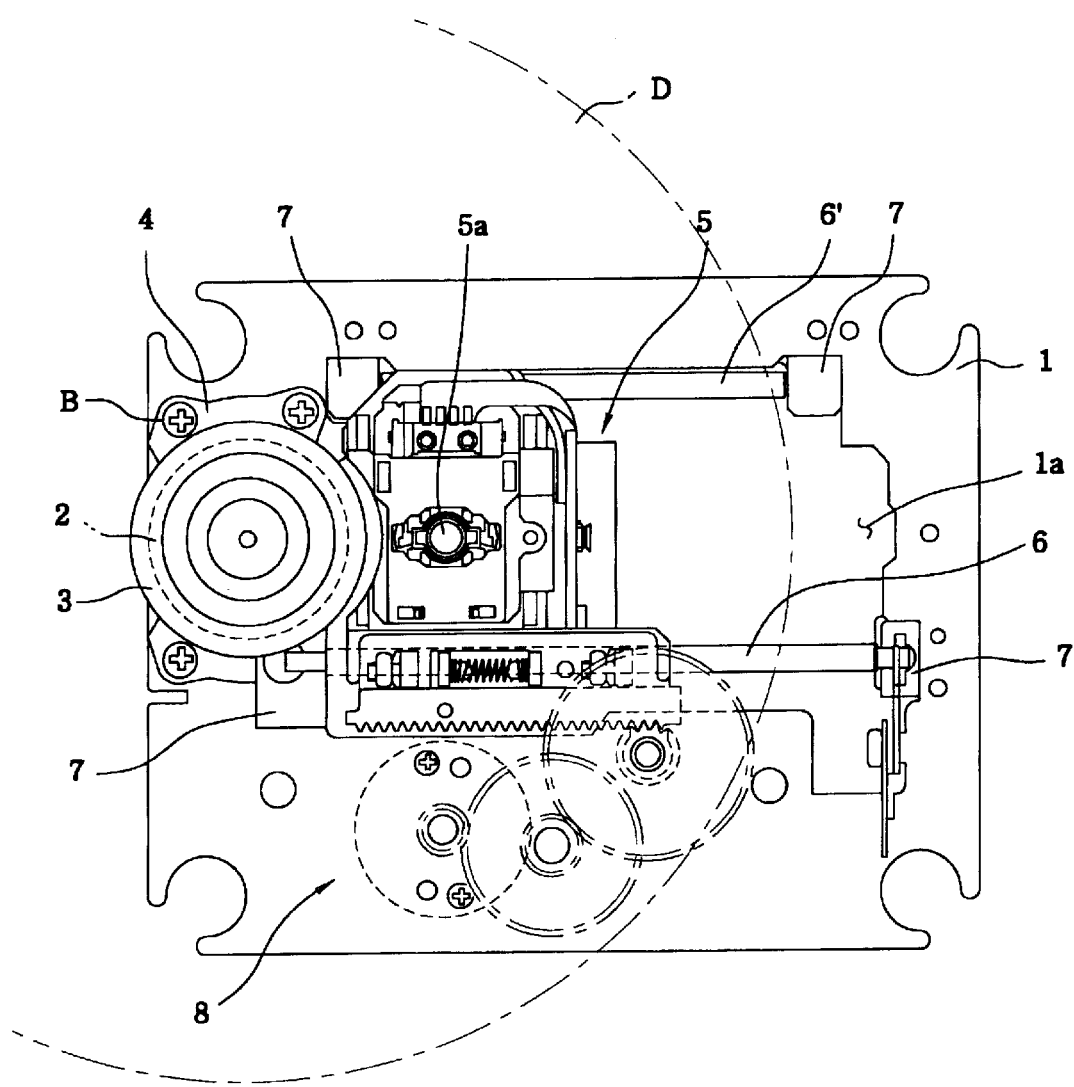
FIG. 1 is a plan view showing a conventional deck base assembly of an optical writing and reading apparatus.
Figure 2:
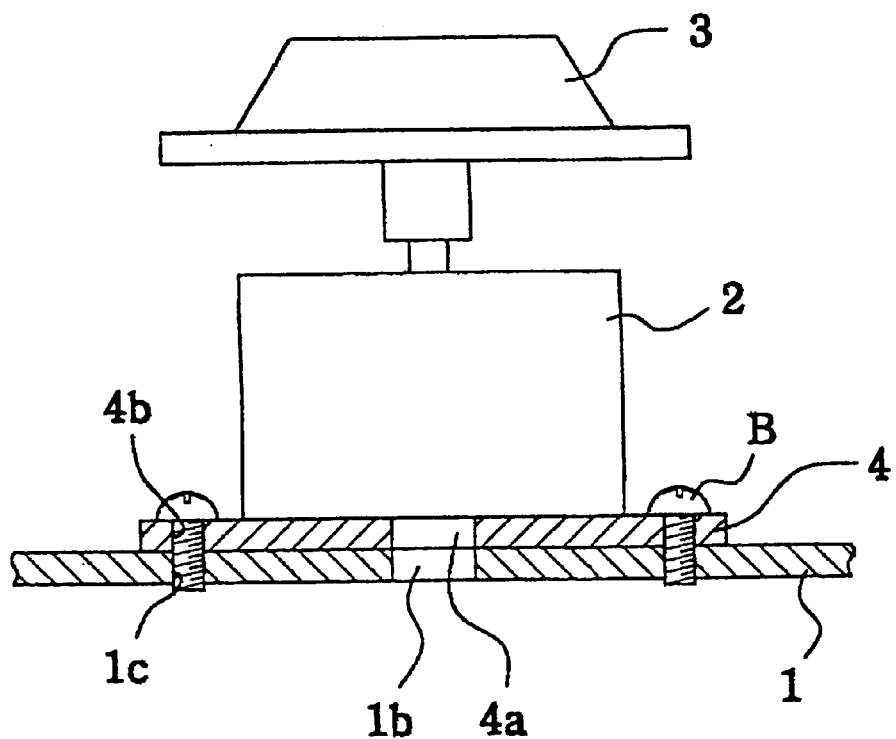
FIG. 2 is a cross-sectional showing a conventional deck base on which a spindle motor is mounted.

This invention will be described in further detail by way of example with reference to the accompanying drawings. Reference now should be made to the drawings, in which the same reference numerals are used throughout the different drawings to designate the same or similar components.

Figure 3:
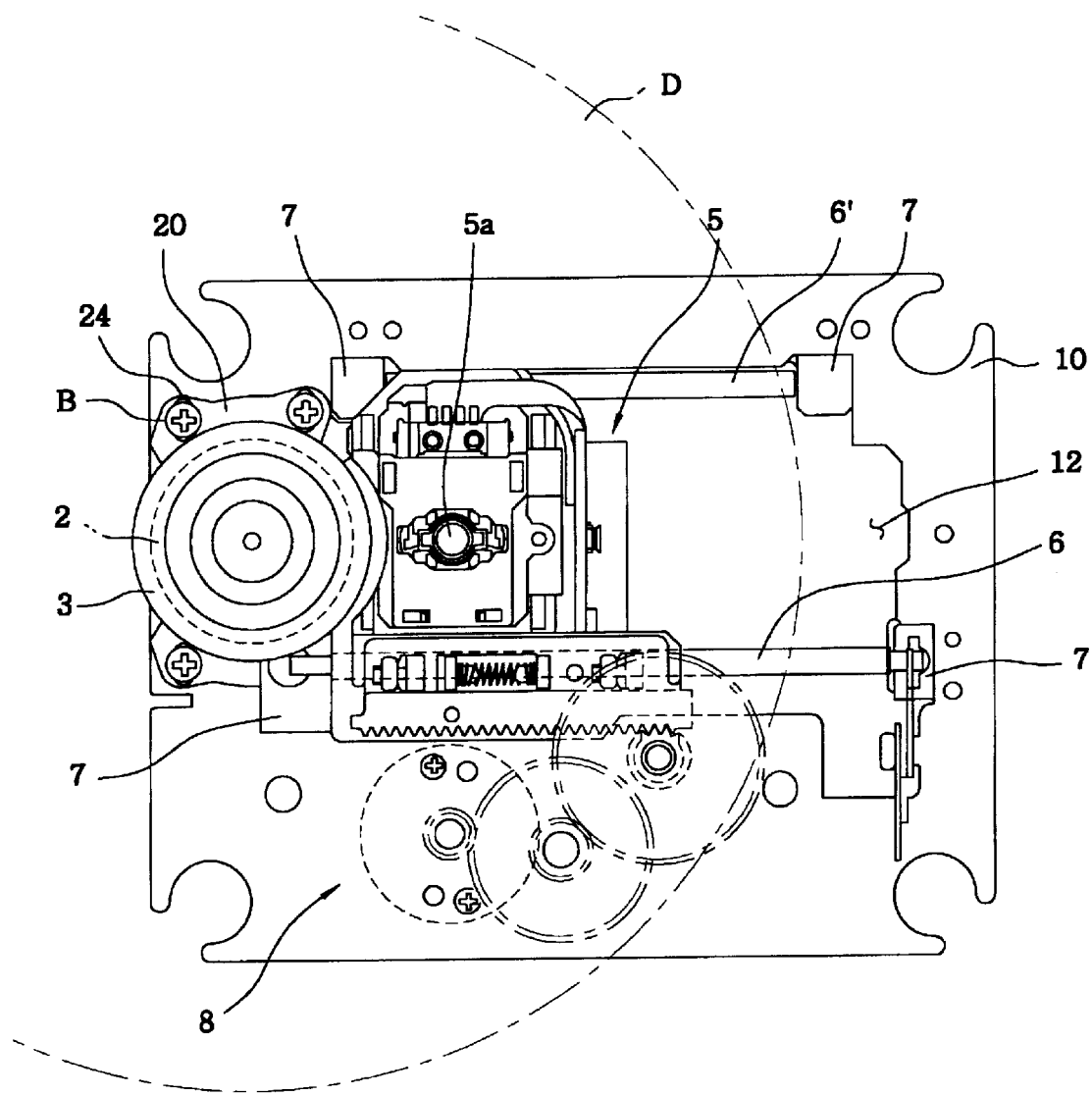
FIG. 3 is a plan view showing a deck base assembly of an optical writing and reading apparatus according to the present invention.
Figure 4:
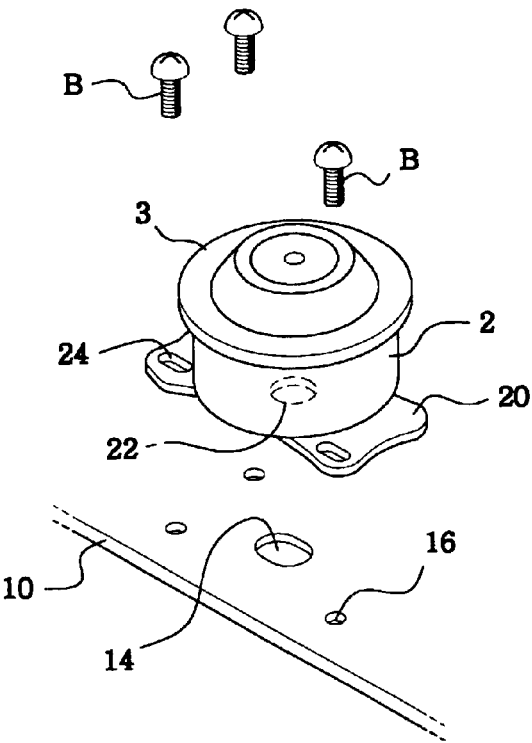
FIG. 4 is an exploded perspective view showing a spindle motor and a deck base according to the present invention.
Figure 5:
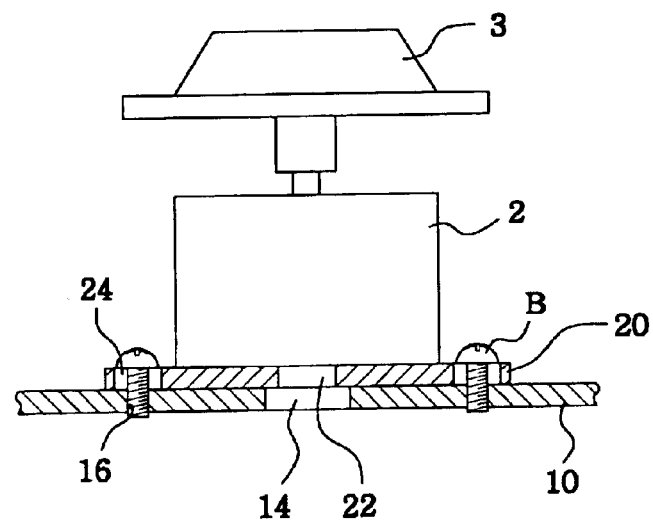
FIG. 5 is a cross-sectional view showing a spindle motor attached to a deck base according to the present invention.

FIG. 3 shows a deck base assembly of an optical writing and reading apparatus according to the present invention, FIGS. 4 and 5 show a spindle motor and a deck base according to the present invention.

As shown in FIG. 3, a deck base assembly of an optical writing and reading apparatus according to the present invention is configured as follows; A deck base 10 is formed with an opening 12 at its center, and is provided adjacent to the opening 12 with a spindle motor 2 fixed thereto by a bracket 20. A shaft of the spindle motor is coupled to a turntable 3 on which an optical disk "D" is seated. Therefore, the turntable 3 is rotatably supported on the shaft of the spindle motor.

A primary shaft 6 and a secondary shaft 6' are extended parallel to and along both sides of the opening 12 in parallel, and the opposite ends of the primary and secondary shafts 6 and 6' are supported on the deck base 1 by support members 7 which are fixed to the deck base 1 to be adjusted in tilt.

An optical pickup 5 including an object-glass 5a is mounted on the primary and secondary shafts 6 and 6' to be positioned above the opening 12, and moved along the primary and secondary shafts 6 and 6' by the transmission gears 8.

An operation of installing a spindle motor on a deck base is described with reference to FIGS. 4 and 5.

The spindle motor 2 is integrally attached at its bottom with a bracket 20, and is fastened to a deck base 10 via the bracket 4. The spindle motor 2 and the bracket 20 may be separately manufactured and then integrally coupled to each other, or the spindle motor 2 and the bracket 20 may be initially manufactured into an integral structure.

The deck base 10 is formed with a center hole 14 over which the spindle motor 2 is positioned, and is formed around the center hole 14 with fastening holes 16 through which a plurality of screws "B" are screwed. At this point, the center hole 14 is formed into an elongated hole sufficiently extended in a direction perpendicular to the primary and secondary shafts in consideration of phase differences between the center of a turntable and the center of an object-glass which occurs during assembly. Alternatively, the center hole 14 may be shaped into a perfect circular hole having a sufficient diameter in consideration of an adjusting range of a position of the spindle motor 2.

Thereafter, a bracket 20 is fitted at its center portion with a jig (not shown) so that the bracket 20 is formed with a center reference hole 22 to adjust a position of the spindle motor. The bracket 20 is also formed around the center reference hole 22 with assembling holes 24 with specific spacing therebetween. The assembling holes 24 are formed at locations corresponding to the fastening holes 16 of the deck base 10. As is the case with the center hole 14, the assembling holes 24 are formed into an elongated hole sufficiently extended in a direction perpendicular to the primary and secondary shafts in consideration of phase difference between the center of a turntable and the center of an object-glass which occurs during assembly.

The center reference hole 22 of the bracket 20 attached to the bottom of the spindle motor 2 is fitted with a jig. After a position of the spindle motor 2 is adjusted in a direction perpendicular to the primary and second shafts and to coincide with the center of the object-glass 5a, screws "B" are screwed to the fastening holes 16 of the deck base 10 through the assembling holes 24 of the bracket 20, so that the spindle motor 2 is firmly fixed on the deck base 10.

At this point, since the center hole 14 of the deck base 10 and the assembling hole 24 of the bracket 20 are shaped into elongated holes, it is possible to adjust a position of the spindle motor 2.

Therefore, the present invention is capable of overcoming phase differences between the turntable 3 and the object-glass 5a by easily adjusting a position of the spindle motor 2 while assembling the spindle motor 2 after attachment of components, excepting the spindle motor 2, to the deck base 10.

Therefore, since the present invention can simply solve a problem caused by phase differences which is occurred during assembly, by adjusting a position of the spindle motor 2, performance of products and thus reliability of products are enhanced.

Figure 6:
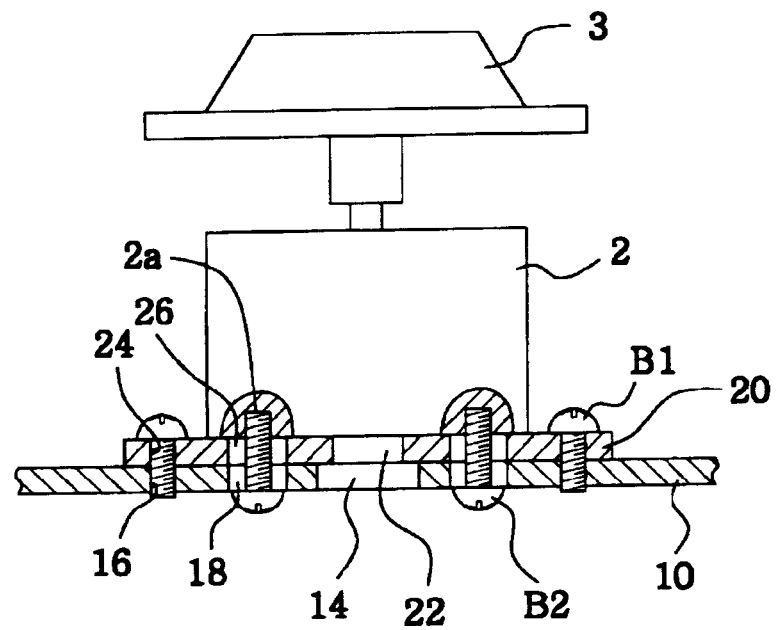
FIG. 6 is a cross-sectional view showing a spindle motor attached to a deck base according to another embodiment of the present invention.

FIG. 6 shows another embodiment of a spindle motor and a deck base according to the present invention.

As shown in the drawing, a deck base 10 is attached at its upper surface with a bracket 20 by screws "B1", and the bracket 20 is attached at its upper surface to a spindle motor 2 by screws "B2".

The deck base 10 is formed with a center hole 14, over which the spindle motor is positioned, and is formed around the center hole 14 with joint holes 18 which are elongated in a direction perpendicular to a moving direction of the optical pickup. Furthermore, the deck base 10 is formed outside of the assembling holes 18 with a plurality of fastening holes 16 by the screws "B1". The joint holes 18 are provided at two symmetrical positions with respect to the center hole 14.

Although the center hole 14 is preferably formed into an elongated hole having a major axis in considering a maximum range of position adjustment of the spindle motor so as not to interfere to adjustment of a position of the spindle motor along the elongated joint holes 18, the center hole 14 may be formed into a perfect circular hole having a large diameter which will afford a maximum range of position adjustment of the spindle motor.

The bracket 20 is centrally formed with a center reference hole 22 corresponding to the center hole 14, into which a jig (not shown) is fitted, and is formed around the center reference hole with elongated assembling holes 26 corresponding to the joint holes 18. Moreover, the bracket 20 is formed with assembling holes 24 at positions corresponding to the fastening holes 16 of the deck base 10.

The spindle motor 2 is formed at its bottom with threaded fastening holes 2a at positions corresponding to the inner assembling holes 26 of the bracket 20, into which the screws "B2" are screwed.

After the deck base 10 and the bracket 20, having holes necessary to assemble the components, are prepared, the bracket 20 is placed on the deck base 10. The screws "B1" are first screwed into the fastening holes 16 through the outer assembling holes 24 of the bracket 20 to fasten the bracket to the deck base 10.

Subsequently, a spindle motor 2 including a turntable 3 is placed on the bracket 20, and screws "B2" are passed through the joint holes 18 and the assembling holes 26 and then temporarily screwed into the fastening threaded holes 2a such that the spindle motor 2 can be moved. After a position of the spindle motor 2 is adjusted resulting in the center of the spindle motor 2 being aligned with the center of the object-glass 5a, the screws "B2" are firmly screwed to the spindle motor 2 so as not to allow the spindle motor 2 to move.

As such, this embodiment can overcome phase difference between the turntable 3 and the object-glass 5a by adjusting a position of the spindle motor 2.

Figure 7:
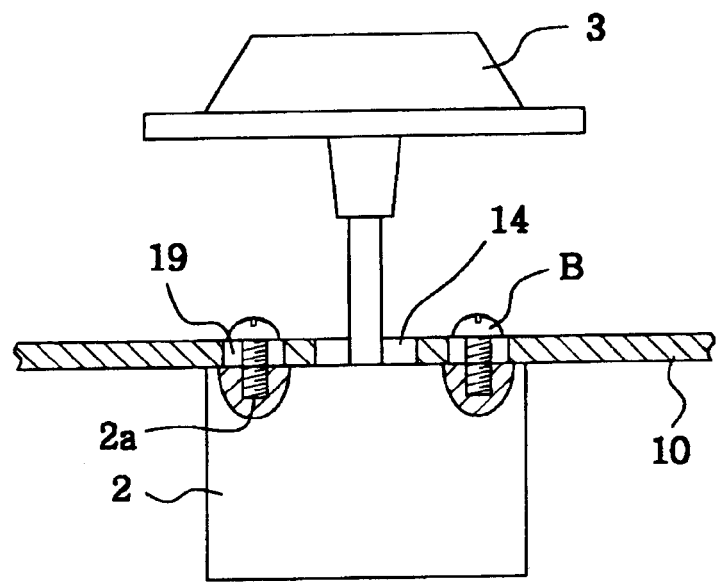
FIG. 7 is a cross-sectional view showing a spindle motor attached to a deck base according to a further embodiment of the present invention.

FIG. 7 shows a further embodiment of a spindle motor attached to a deck base according to the present invention.

As shown in the drawing, in this embodiment, a spindle motor 2 is attached to a lower surface of a deck base 10. The spindle motor 2 is provided at its upper surface with a plurality of threaded fastening holes 2a. The deck base 10 is centrally formed with a center hole 14 through which a shaft of the spindle motor 2 passes, and formed around the center hole with joint holes 19 corresponding to the threaded fastening holes 2a of the spindle motor 2. In this case, the joint holes 19 are formed into elongated holes sufficiently extended in a direction perpendicular to the primary and secondary shafts in consideration of phase differences between the center of a turntable and the center of an object-glass which occurs during assembly.

As such, this embodiment can also overcome phase differences between the turntable 3 and the object-glass 5a by adjusting a position of the spindle motor 2 as is the case with the above embodiments.

It should be understood that the present invention is not limited to the above-described embodiments, and many widely different embodiments of the invention may be made without departing from the spirit and scope thereof. For example, a spindle motor may be formed with threaded fastening holes at its lower surface, and a deck base may have elongated joint holes corresponding to the fastening holes of the spindle motor, so that the spindle motor can be directly fixed to the deck base and be adjusted in a mounting position.

As described above, the present invention provides an optical writing and reading apparatus which enables the position of an optical pickup to be easily adjusted in a direction perpendicular to a moving path of the optical pickup in order to overcome phase differences between a turntable and an object-glass occurring during assembly. Accordingly, optical writing and reading performances and reliability of products are improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An optical writing and reading apparatus comprising:
   a deck base having an opening at its center, on which an optical pickup including an object-glass is mounted and can be moved along both sides of the opening, and which is formed adjacent to the opening with a center hole elongated in a direction perpendicular to a moving direction of the optical pickup, and is formed around the center hole with a plurality of fastening holes into which screws are screwed; and
   a spindle motor having a turntable at its shaft and having an integral bracket at its bottom surface, the bracket being formed at its center with a center reference hole and formed around the center reference hole with assembling holes elongated in a direction perpendicular to a moving direction of the optical pickup, the assembling holes being arranged at positions corresponding to the fastening holes of the deck base.

2. The optical writing and reading apparatus as set forth in claim 1, in which lengths of major axes of the center hole and the assembling holes are determined in consideration of the maximum phase difference between the center of the turntable and the center of the object-glass, which may occur during assembly.

3. The optical writing and reading apparatus as set forth in claim 1, in which the center hole is shaped as a perfect circular hole and has a diameter within the maximum adjusting range of the spindle motor.

4. An optical writing and reading apparatus comprising:
   a deck base having an opening at its center, on which an optical pickup including an object-glass is mounted and can be moved along both sides of the opening, and which is formed adjacent to the opening with a center hole, and is formed around the center hole with fastening holes elongated in a direction perpendicular to a moving direction of the optical pickup;
   a bracket fixedly attached to the deck base, which is formed at its center with a center reference hole corresponding to the center hole of the deck base and formed around the center reference hole with assembling elongated, holes corresponding to the fastening holes of the deck base; and
   a spindle motor fixedly attached to the bracket and including a turntable, which is formed with fastening holes at its lower surface which correspond to the assembling holes of the deck base into which screws are screwed.

5. The optical writing and reading apparatus as set forth in claim 4, in which lengths of major axes of the fastening holes and the assembling holes are determined in consideration of the maximum phase differences between the center of the turntable and the center of the object-glass which may occur during assembly.

6. The optical writing and reading apparatus as set forth in claim 4, in which the center hole is shaped as an elongated hole and has a major diameter within the maximum adjusting range of the spindle motor.

7. The optical writing and reading apparatus as set forth in claim 4, in which the center hole is shaped as a perfect circular hole and has a diameter within the maximum adjusting range of the spindle motor.

8. An optical writing and reading apparatus comprising:
   a deck base having an opening at its center, on which an optical pickup including an object-glass is mounted to be moved along both sides of the opening, and which is formed adjacent to the opening with a center hole, and is formed around the center hole with a plurality of assembling holes elongated in a direction perpendicular to a moving direction of the optical pickup; and
   a spindle motor formed with fastening holes at its upper surface which correspond to the assembling holes of the deck base, the fastening holes being screwed with screws, the spindle motor having a shaft which passes through the center hole of the deck base and having a turntable at an upper end of its shaft.

9. The optical writing and reading apparatus as set forth in claim 8, in which lengths of major axes of the assembling holes are determined in consideration of the maximum phase difference between the center of the turntable and the center of the object-glass, which may occur during assembly.

10. An optical writing and reading apparatus comprising:
    a deck base having an opening at its center, on which an optical pickup including an object-glass is mounted to be moved along both sides of the opening, and which is formed adjacent to the opening with a center hole, and is formed around the center hole with a plurality of assembling holes elongated in a direction perpendicular to a moving direction of the optical pickup; and a spindle motor having a turntable, which is formed with fastening holes at its lower surface which correspond to the assembling holes of the deck base, the fastening holes being screwed with screws.

11. The optical writing and reading apparatus as set forth in claim 10, in which lengths of major axes of the assembling holes are determined in consideration of the maximum phase difference between the center of the turntable and the center of the object-glass, which may occur during assembly.

12. An optical writing and reading apparatus comprising:
    a deck base formed with an opening and formed with a plurality of assembling holes around the opening;
    an optical pickup mounted on the deck base to be moved along the opening;
    a spindle motor formed with fastening holes corresponding to the assembling holes of the deck base and fixed to the deck base by screwing screws through the assembling holes; and
    a turntable coupled to a shaft of the spindle motor;
    the assembling holes of the deck base being shaped as elongated holes extended in a direction perpendicular to a moving direction of the optical pickup to allow the spindle motor to be adjusted in position.

13. The optical writing and reading apparatus as set forth in claim 12, in which lengths of major axes of the assembling holes are determined in consideration of the maximum phase difference between the center of the turntable and the center of the object-glass, which may occur during assembly.

* * * * *